(12) United States Patent
Lobovsky et al.

(10) Patent No.: US 6,764,628 B2
(45) Date of Patent: Jul. 20, 2004

(54) COMPOSITE MATERIAL COMPRISING ORIENTED CARBON NANOTUBES IN A CARBON MATRIX AND PROCESS FOR PREPARING SAME

(75) Inventors: Alex Lobovsky, New Providence, NJ (US); James Matrunich, Mountainside, NJ (US); Ray H. Baughman, Morris Plains, NJ (US); Igor Palley, Madison, NJ (US); Gary A. West, Budd Lake, NJ (US); Ilan Golecki, Parsippany, NJ (US)

(73) Assignee: Honeywell International Inc., Morristown, NJ (US)

( * ) Notice: Subject to any disclaimer, the term of this patent is extended or adjusted under 35 U.S.C. 154(b) by 320 days.

(21) Appl. No.: 10/090,223

(22) Filed: Mar. 4, 2002

(65) Prior Publication Data

US 2003/0165648 A1 Sep. 4, 2003

(51) Int. Cl.[7] .................................................. D01D 5/34
(52) U.S. Cl. ............. 264/172.15; 264/108; 264/171.26; 264/172.17; 264/DIG. 19; 264/DIG. 26
(58) Field of Search .............................. 264/108, 171.1, 264/171.26, 172.15, 172.17, DIG. 19, DIG. 26

(56) References Cited

U.S. PATENT DOCUMENTS

| | | |
|---|---|---|
| 3,639,953 A | 2/1972 | Kimura et al. |
| 4,297,307 A | 10/1981 | Taylor |
| 4,339,021 A | 7/1982 | Kosuda et al. |
| 4,504,454 A | 3/1985 | Riggs |
| 4,663,230 A | 5/1987 | Tennent |
| 4,741,829 A | 5/1988 | Takemura et al. |
| 4,847,063 A | 7/1989 | Smith |
| 5,149,517 A | 9/1992 | Fain et al. |
| 5,149,584 A | 9/1992 | Baker et al. |
| 5,156,831 A | 10/1992 | Fain et al. |
| 5,165,909 A | 11/1992 | Tennent et al. |
| 5,260,013 A | 11/1993 | Samuelson |
| 5,298,298 A | 3/1994 | Hoffman |
| 5,338,605 A | 8/1994 | Noland et al. |
| 5,457,343 A | 10/1995 | Ajayan et al. |
| 5,556,704 A | 9/1996 | Prevorsek et al. |

(List continued on next page.)

FOREIGN PATENT DOCUMENTS

| | | |
|---|---|---|
| EP | 1 054 036 A1 | 11/2000 |
| WO | WO 01/92381 A | 12/2001 |

OTHER PUBLICATIONS

Abstract of JP 51 099 122 A, XP002247734, Sep. 1, 1976.
Satish Kumar et al., "Fibers From Polypropylene/Nano Carbon Fiber Composites", Polymer, vol. 43, 2002, pp. 1701–1703.

(List continued on next page.)

Primary Examiner—Melvin C. Mayes
(74) Attorney, Agent, or Firm—Larry J. Palguta

(57) ABSTRACT

Fiber spinning of two polymer compositions wherein one of the compositions contains carbon nanotubes produces structures such as fibers, ribbons, yarns and films of carbon nanotubes. The polymers are removed and stabilization of the carbon nanotube material is achieved by post-spinning processes. The advances disclosed herein enable the carbon nanotube composites to be used in actuators, supercapacitors, friction materials and in devices for electrical energy harvesting.

13 Claims, 5 Drawing Sheets

U.S. PATENT DOCUMENTS

| | | | |
|---|---|---|---|
| 5,578,543 A | 11/1996 | Tennent et al. | |
| 5,643,670 A | 7/1997 | Chung | |
| 5,773,834 A | 6/1998 | Yamamoto et al. | |
| 5,780,157 A | 7/1998 | Tuffias et al. | |
| 5,803,210 A | 9/1998 | Kohno et al. | |
| 5,814,403 A | 9/1998 | Anderson et al. | |
| 5,871,838 A | 2/1999 | Klett et al. | |
| 5,877,110 A | 3/1999 | Snyder et al. | |
| 5,965,470 A | 10/1999 | Bening et al. | |
| 6,113,722 A | 9/2000 | Hoffman et al. | |
| 6,143,411 A | 11/2000 | Ferguson | |
| 6,235,674 B1 | 5/2001 | Tennent et al. | |
| 6,265,466 B1 | 7/2001 | Glatkowski et al. | |
| 6,280,697 B1 | 8/2001 | Zhou et al. | |
| 6,299,812 B1 * | 10/2001 | Newman et al. | 264/176.1 |
| 6,331,265 B1 * | 12/2001 | Dupire et al. | 264/289.3 |
| 6,426,134 B1 * | 7/2002 | Lavin et al. | 428/300.1 |
| 6,667,099 B1 * | 12/2003 | Greiner et al. | 428/398 |
| 6,682,677 B2 * | 1/2004 | Lobovsky et al. | 264/172.11 |
| 2002/0185770 A1 * | 12/2002 | McKague | 264/108 |
| 2003/0026985 A1 * | 2/2003 | Greiner et al. | 428/373 |
| 2003/0083421 A1 * | 5/2003 | Kumar et al. | 524/496 |
| 2003/0236588 A1 * | 12/2003 | Jang et al. | 700/119 |
| 2004/0022981 A1 * | 2/2004 | Hu et al. | 428/36.9 |

OTHER PUBLICATIONS

Kiyoshi Yase et al., *Mat Res. Soc. Symp. Proc.*, vol. 359, (1995), pp. 81–86.

Ray H. Baughman et al., *Science*, vol. 284, (May 21, 1999), pp. 1228 and 1340–1344.

\* cited by examiner

COMPOSITE MATERIAL COMPRISING ORIENTED CARBON NANOTUBES IN A CARBON MATRIX AND PROCESS FOR PREPARING SAME

FIELD OF THE INVENTION

Methods are described for the spinning of carbon nanotube fibers containing a high loading of nanotubes in a fiber component; the stabilization of spun materials by post-spinning processes; and the application of such materials made by spinning.

DESCRIPTION OF THE RELATED ART

Since the discovery of carbon nanotubes by Iijima and coworkers (Nature 354, 56–58, (1991) and Nature 361, 603–605 (1993)) various types of carbon nanotubes (NTs) have been synthesized. A single-wall carbon nanotube (SWNT) consists of a single layer of graphite that has been wound into a seamless tube having a nanoscale diameter. A multi-wall carbon nanotube (MWNT), on the other hand, comprises two or more such cylindrical graphite layers that are coaxial. Both single-wall and multi-wall nanotubes have been obtained using various synthetic routes, which typically involve the use of metallic catalysts and very high processing temperatures. Typical synthesis routes are those employing a carbon arc, laser evaporation of carbon targets, and chemical vapor deposition (CVD).

SWNTs are produced by the carbon-arc discharge technique using a pure carbon cathode and a carbon anode containing a mixture of graphite powder and catalytic metal(s), like Fe, Ni, Co and Cu (D. S. Bethune et al. Nature 363, 605–7 (1993) and S. Iijima and T. Ichihashi, Nature 363, 603–5 (1993)). C. Journet et al. (Nature 388, 756–758 (1997)) have described an improved carbon-arc method for the synthesis of SWNTs which uses Ni/Y (4.2/1 atom %) as the catalyst. Co-vaporization of carbon and the metal catalyst in the arc generator produced a web-like deposit of SWNTs that is intimately mixed with fullerene-containing soot.

Smalley's group (A. Thess et al., Science 273, 483–487 (1996)) developed a pulsed laser vaporization technique for synthesis of SWNT bundles from a carbon target containing 1 to 2% (w/w) Ni/Co. The dual laser synthesis, purification and processing of single-wall nanotubes has been described in the following references: J. Liu et al., Science 280, 1253 (1998); A. G. Rinzler et al., Applied Physics A 67, 29 (1998); A. G. Rinzler et al., Science 269, 1550 (1995); and H. Dai, et al., Nature 384, 147 (1996).

The CVD method described by Cheng et al. (Appl. Phys. Lett. 72, 3282 (1998)) involves the pyrolysis of a mixture of benzene with 1 to 5% thiophene or methane, using ferrocene as a floating catalyst and 10% hydrogen in argon as the carrier gas. The nanotubes form in the reaction zone of a cylindrical furnace held at 1100–1200° C. Depending on the thiophene concentration, the nanotubes form as either multi-wall nanotubes or bundles of single-wall nanotubes. Another useful method for growing single-wall nanotubes uses methane as the precursor, ferric nitrate contained on an alumina catalyst bed, and a reaction temperature of 1000° C.

Another CVD synthesis process was described by R. E. Smalley et al. in PCT International Application No. WO 99-US25702, WO 99-US21367 and by P. Nikolaev et al. in Chem. Phys. Lett. 313, 91–97 (1999). This process, known as the HiPco process, utilizes high pressure (typically 10–100 atm) carbon monoxide gas as the carbon source, and nanometer sized metal particles (formed in-situ within the gas stream from organo-metallic precursors) to catalyze the growth of single-wall carbon nanotubes. The preferred catalyst precursors are iron carbonyl ($Fe(CO)_5$) and mixtures of iron carbonyl and nickel carbonyl ($Ni(CO)_4$). The HiPco process produces a SWNT product that is essentially free of carbonaceous impurities, which are the major component of the laser-evaporation and carbon-arc products. The process enables control of the range of nanotube diameters produced, by controlling the nucleation and size of the metal cluster catalyst particles. In this way, it is possible to produce unusually small nanotube diameters, about 0.6 to 0.9 nm.

The nanotube-containing products of the laser-evaporation and carbon-arc processes invariably contain a variety of carbonaceous impurities, including various fullerenes and less ordered forms of carbon soot. The carbonaceous impurity content in the raw products of the laser and carbon arc processes typically exceeds 50 weight %. Purification of these products generally relies on selective dissolution of the catalyst metals and highly ordered carbon clusters (called fullerenes) followed by selective oxidation of the less ordered carbonaceous impurities. A typical purification process is described by Lui et al. in Science 280, 1253 (1998). This method involves refluxing the crude product in 2.6 M nitric acid for 45 hours, suspending the nanotubes in pH 10 NaOH aqueous solution using a surfactant (e.g, Triton X-100 from Aldrich, Milwaukee, Wis.), followed by filtration using a cross-flow filtration system. While the effects of these purification processes on the nanotubes themselves are not completely understood, it is believed that the nanotubes are shortened by oxidation.

As discussed by B. I. Jakobson and R. E. Smalley (American Scientist 85, 325, 1997) SWNT and MWNT materials are promising for a wide variety of potential applications because of the exceptional physical and chemical properties exhibited by the individual nanotubes or nanotube bundles. Some SWNT properties of particular relevance include metallic and semiconducting electrical conductivity, depending on the specific molecular structure, extensional elastic modulus of 0.6 TPa or higher, tensile strengths on the order of ten to one hundred GPa, and surface areas that can exceed 300 $m^2/g$.

The proposed applications of carbon nanotubes include mechanical applications, such as in high-strength composites, electrical applications, and multifunctional applications in which different properties aspects of the carbon nanotubes are simultaneously utilized. Tennent et al. in U.S. Pat. No. 6,031,711 describe the application of sheets of carbon nanotubes as high performance supercapacitors. In this application, a voltage difference is applied to two high-surface-area carbon nanotube electrodes that are immersed in a solid or liquid electrolyte. Current flows in the charging circuit, thereby injecting charge in the nanotubes, by creating an electrostatic double layer near the nanotube surfaces.

The application of carbon nanotube sheets as electromechanical actuators has been recently described (R. H. Baughman et al., Science 284, 1340 (1999)). These actuators utilize dimension changes that result from the double-layer electrochemical charge injection into high-surface-area carbon nanotube electrodes. If carbon nanotubes can be assembled into high modulus and high strength assemblies (such as filaments, ribbons, yarns, or sheets) that maintain their ability to electrochemically store charge, then superior actuator performance should be obtainable. The problem has been that no methods are presently available for the manufacture of nanotube articles that have these needed characteristics.

These and other promising applications require assembling the individual nanotubes into macroscopic arrays that effectively use the attractive properties of the individual nanotubes. This obstacle has so far hindered applications development. The problem is that MWNTs and SWNTs are insoluble in ordinary aqueous solvents and do not form melts even at very high temperatures. Under certain conditions, and with the aid of surfactants and ultrasonic dispersion, bundles of SWNTs can be made to form a stable colloidal suspension in an aqueous medium. Filtration of these suspensions on a fine-pore filter medium, as described by Lui et al. in Science 280, 1253 (1998), results in the production of a paper-like sheet which has been called "bucky paper" (in reference to buckminsterfullerene, or $C_{60}$, the first member of the fullerene family of carbon cluster molecules). Such sheets, which can range in conveniently obtainable thickness from 10–100 microns, possess mechanical strength derived from the micro-scale entanglement of the nanotube bundles. Bucky paper preserves the large accessible surface area of the nanotube bundles, but typically exhibit greatly reduced elastic modulus values (a few GPa) that are a very small fraction of the intrinsic elastic modulus of either the individual SWNTs or the SWNT bundles.

A recently reported method for processing carbon nanotubes provides nanotube fibers whose mechanical properties significantly surpass those of ordinary bucky paper. This method was described by B. Vigolo et al. in *Science* 290, 1331 (2000) and by R. H. Baughman in *Science* 290, 1310 (2000). According to this process, the carbon nanotubes are first dispersed in an aqueous or non-aqueous solvent with the aid of a surfactant. A narrow jet of this nanotube dispersion is then injected into a rotating bath of a more viscous liquid in such a way that shear forces at the point of injection cause partial aggregation and alignment of the dispersed nanotube bundles. This viscous liquid contains an agent or agents, which act to neutralize the dispersing action of the surfactant. Consequently, the jet of dispersed nanotubes is rapidly coagulated into a low-density array of entangled nanotubes—thereby gaining a small (but useful) amount of tensile strength. The wet filament is then washed in water, and the washed filament is subsequently withdrawn from the wash bath and dried. During which draw-dry process, capillary forces collapse the loosely tangled array of nanotubes into a compact thin fiber having a density of about 1.5 gm/cc (close to the theoretical density of a compact array of carbon nanotubes). This total process will henceforth be referred to as the coagulation spinning (CS) process.

In a typical CS process, as described by Bernier et al., the nanotubes are dispersed in water with the aid of sodium dodecyl sulphate (SDS) surfactant. The viscous carrier liquid is an aqueous solution of polyvinyl alcohol (PVA) in which the PVA also serves to neutralize the effect of the SDS surfactant by directly replacing these molecules on the NT surfaces. Bernier et al. describe preferred concentrations for the various ingredients, and viscosity ranges and flow velocities of the spinning solutions. Polarized light microscopy of the coagulated nanotube fibers confirms preferential alignment of the NTs along the fiber axis. Further evidence of NT alignment is provided by the measured extensional elastic modulus, which is approximately 10 GPa for the final CS fibers, as compared to typically 1 GPa for bucky paper.

Unfortunately, the fibers made by the CS process are not useful in applications as electrodes immersed in liquid electrolytes because of a surprising shape memory effect. This shape memory effect causes the CS fibers to dramatically swell (by 100% or more) and lose most of their dry-state modulus and strength. Because of this structural instability of fibers made by the CS process, they are unusable for critically important applications that use liquid electrolytes, such as in supercapacitors and in electromechanical actuators. In contrast, as-produced bucky paper made from the same nanotubes can be used for both capacitor and actuator devices that use liquid electrolytes.

Yashi et al. (Y. K. Yashi et al., Materials Research Society Symposium Proceedings, "Science and Technology of Fullerene Materials," 359, pg. 81–6, 1995) attempt to overcome the problems inherent in the CS process by using a method for forming a bundle of aligned carbon nanotubes by extruding a mixture of carbon nanotubes and polypropylene through a small die having a diameter of 2 mm which is maintained at 200° C. These materials do not have properties that would render them useful in actual mechanical or electrochemical applications, since they are made with such a low loading of the carbon nanotubes and the polypropylene remains in the final product. In the present method, the polymer carrier is removed.

Glatkowski et al. (U.S. Pat. No. 6,265,466) teach a method for preparing an electromagnetic shielding composite having nanotubes wherein the nanotubes are oriented when a shearing force is applied to the composite. The method includes a step of providing a polymer with an amount of nanotubes, and imparting a shearing force to the polymer and nanotubes to orient the nanotubes. Glatkowski et al. generically teach that the nanotube concentration can be as high as 15 wt %, but it is preferable that the concentration is 0.1 to 1.5 wt %. These materials do not have properties that would render them useful in actual mechanical or electrochemical applications, since they are made with such a low loading of the carbon nanotubes. In the present method, a much higher shearing force is used to orient the nanotubes, thereby allowing for a much higher concentration of the nanotubes in the final product.

Lobovsky et al. (copending U.S. Ser. No. 09/946432) teach a method of forming fibers, ribbons and yarns, wherein the carbon nanotubes are first dispersed in an aqueous or non-aqueous solvent with the aid of a surfactant in the CS process described above. The present method has the advantage over the method of Lobovsky et al. in that the present method provides more freedom in the shaping of the final product and it allows for increased loadings of the carbon nanotubes, and as such can be used in a greater variety of applications.

Thus, the prior art processes fail to provide materials containing carbon nanotube fibers that have high modulus, high strength, and high toughness for structural applications, as well as for multifunctional applications where extreme mechanical properties are combined with other functionalities, such as actuation, mechanical energy harvesting, mechanical dampening, thermal energy harvesting, and energy storage. Although the individual nanotube fibers have very attractive performance, the prior art has not demonstrated processes where these properties of the individual nanotubes can be effectively used in macrofibers composed of the nanofibers.

SUMMARY OF THE INVENTION

The present invention solves the problems associated with prior art processes, by providing an efficient method for melt spinning carbon nanotube composites wherein the carbon nanotubes have a high loading in the composites (greater than 8%), and such high loadings result in the mechanical properties, electronic conductivity, or electrochemical activity needed for key applications.

The present invention, in part, is drawn to a process which enables the spinning of carbon nanotube fibers containing a high loading of nanotubes in a fibrous component or a layer. This spinning process is enabled by the use of one or more fiber components as a support and alignment element for another fiber component that contains a polymer that is heavily loaded with carbon nanotubes. This process, which is generically applicable to various types of carbonaceous and non-carbonaceous nanofibers, provides nanotube-containing fibers having complex cross-sections that are particularly applicable for mechanical reinforcement, thermal and electrical conduction, energy storage, energy harvesting, and electromechanical actuation.

The process comprises a step of melt flowing a first composition comprising a core polymer thereby aligning the molecules of the core polymer to be in a substantially parallel arrangement in the direction of the flow and combining a second composition comprising a sheath polymer in the melt phase and carbon nanotubes such that the carbon nanotubes align in the general direction of the core polymer molecules, and a step of removing at least 50 wt % of the core and sheath polymer molecules.

The present invention, in part, is drawn to a structure comprising carbon nanotubes wherein the carbon nanotubes are oriented lengthwise in the same general direction and in a high density.

The present invention, in part, is drawn to an apparatus for preparing the structure comprising aligned carbon nanotubes, said apparatus comprising an upper spinneret and a lower spinneret arranged in such a manner as to create a high shear force on a mixture of polymers and carbon nanotubes to align the carbon nanotubes in the general direction of the flow.

Advantages of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

Figure 1A:
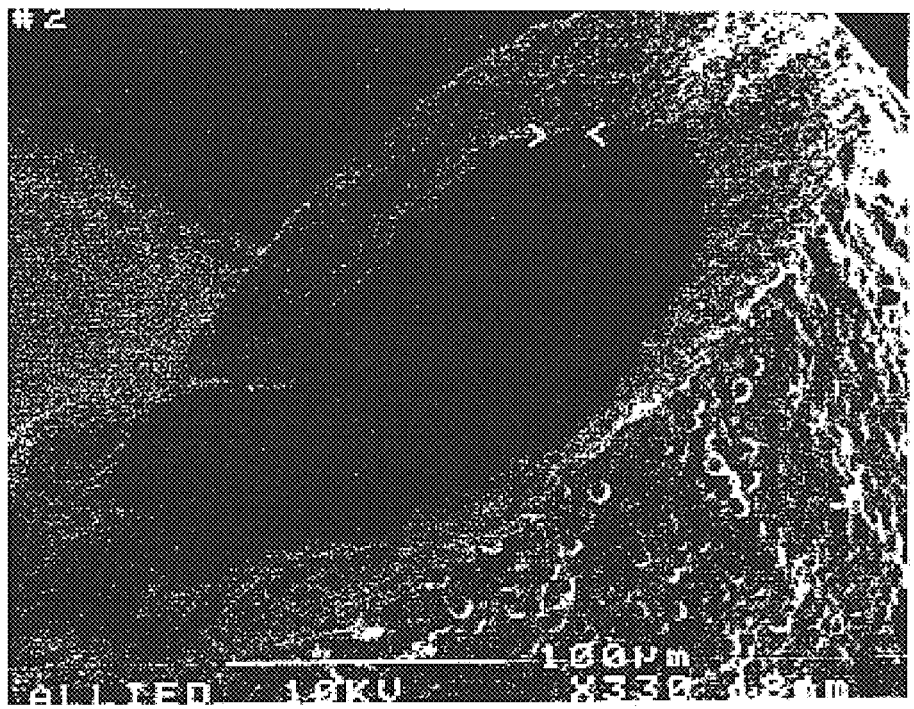
FIG. 1A is a photograph of a hollow macrotube in which an air core is surrounded by a sheath of axially oriented nanotubes.

The coagulation spinning (CS) process of the conventional art has the following liabilities that are eliminated by the present invention: (a) the conventional art process was unstable since it could be practiced only in a narrow range of spinning parameters and a very restricted concentration range for the carbon nanotubes in the spinning solution, (b) the degree of alignment of the fibers produced by the conventional art CS process is not high, and (c) the nanotube fibers spun by the conventional art are not dimensionally stable and the mechanical properties degrade when these fibers are placed in the liquid electrolytes that are needed for key applications.

The present invention, in part, is drawn to a process of making a structure comprising carbon nanotubes, said process comprising: a step of melt flowing a first composition comprising a core polymer through a spinneret to align molecules of the core polymer to be in a substantially parallel arrangement and combining a second composition comprising a sheath polymer in the melt phase and carbon nanotubes with the flow of the first composition thereby aligning the carbon nanotubes to be in the general direction of the core polymer molecules, and a step of removing at least 50% of the core and sheath polymer molecules.

The constituents of the second composition are not particularly limited so long as they are compatible with the constituents of the first composition, i.e., the combination of the two compositions should not separate into multiple phases. Also, the polymers of the two compositions preferably should be able to wet the carbon nanotubes during the flow step.

Additives known in the art, such as plasticizers, antitackifying agents, solvents, etc., can be added to the first and/or second compositions. It is preferred to use additives which improve the ability of the composition to form the carbon nanotube structure and that are easily removed once the structure has been formed.

Preferably, the polymer of the first and second compositions has a melting temperature ($T_m$) of greater than 50° C. and a weight average molecular weight of at least 10,000 (as measured using high pressure liquid chromatography). More preferably the polymer has a $T_m$ in a range of 50–300° C. and a weight average molecular weight in a range of 40,000–2,000,000.

In a preferred embodiment, the second composition comprises a polymer having a backbone comprising at least one structural unit which is identical in type with a structural unit on the backbone of the polymer of the first composition. The structural unit on the backbone of the polymers of the first and second composition is at least one selected from the group consisting of an alkylene, alkene, alkyne, amide, ether, urethane, siloxane, silane, urea, carbonyl and carboxyl.

The polymers of the first and second composition are, individually, a substituted or unsubstituted homopolymer or (block or random) copolymer and is at least one selected from the group consisting of polyolefin (such as polybutadiene, polystyrene, polyethylene, and polypropylene), polyurethane, polysiloxane, polysilane, polyacrylate, polyalkylacrylate (such as polymethylacrylate, or polyethylacrylate), polymethacrylate, polyalkyl methacrylate (such as polymethyl methacrylate or polyethyl methacrylate), polyamide, polyoxymethylene, polyester (such as polyalkylene terephthalate), polyesteramide, polyether and polyetheramide. Preferably, the polymers of the first and second composition are identical in type. More, preferably, the polymers of the first and second composition are polyolefins. Most preferably, the polymers of the first and second composition are both polypropylene.

The type of carbon nanotubes for use in the present invention are not particularly limited, and can be made from any process known in the art. The carbon nanotubes in the second composition is in a concentration of greater than 10 wt % based on the weight of the second composition. Preferably, the concentration of the carbon nanotubes is 15–45 wt %. Most preferably, the concentration of the carbon nanotubes is 25–40 wt %.

During the flow step, the movement of the carbon nanotubes in the polymer composition is akin to the movement of logs in a river, i.e., the carbon nanotubes tend to align in the direction of the flow. The resulting extrusions are analyzed by X-ray diffraction to determine the degree of orientation of carbon nanotubes in the matrix. The degree of orientation "f", known as Hermans orientation parameter, is determined from the relation $$f=(3\langle\cos^2\phi\rangle-1)/2$$

where $\phi$ is the angle between the axis of the extrusion and nanotube. The degree of orientation f is a function that varies from 0 for a sample with randomly oriented nanotubes to 1 for a sample in which all the nanotubes are perfectly aligned along one direction. The composite structure of the present invention comprises carbon nanotubes aligned to give an f value of 0.590–1.00. Preferably, the f value is 0.630–0.900, and most preferably the f value is 0.630–0.750.

The alignment of such a high concentration of carbon nanotubes is made possible by a high shear force imposed in the composition during flow.

In the step of removing the polymer molecules from the carbon nanotube composition, at least 50 mol % of the polymer molecules are removed. Preferably, at least 90 mol % of the polymer molecules are removed. Most preferably, at least 99.5% of the polymer molecules are removed. The removal of the polymer molecules can be done by any method so long as the carbon nanotube structure is not seriously affected. Preferably, the polymer molecules are removed in a melting step. The source of the heat is not particularly limited and includes, for example, a conventional oven or microwave oven.

The inventive process may further comprise a step of densifying the structure by depositing carbon, silicon and/or silicon carbide. The method for performing this step is not particularly limited, and can be performed by any known in the art. When the structure has been densified with carbon CVD, it preferably has a flex strength as measured by the 3-point flex method of at least 0.2 GPa. More preferably the densified structure has a flex strength of 0.2–0.4 GPa. Also, the densified structure has a concentration of at least 15 wt % of carbon nanotubes based on the total weight of the structure. Preferably, the carbon nanotube concentration is 20–80 wt %, and most preferably, the concentration is 30–50 wt %.

Figure 1B:
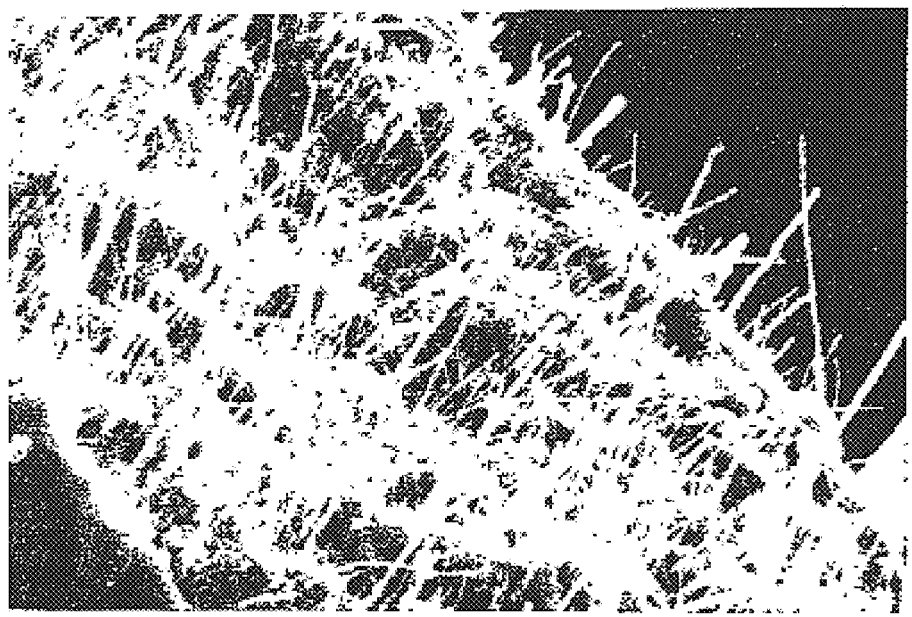
FIG. 1B is a photograph of the hollow macrotube of FIG. 1A showing the section between the superimposed carrots in FIG. 1A at a higher magnification (this shows that the direction of the nanotubes at the break are generally in the direction of the length of the hollow macrotube)
Figure 4:
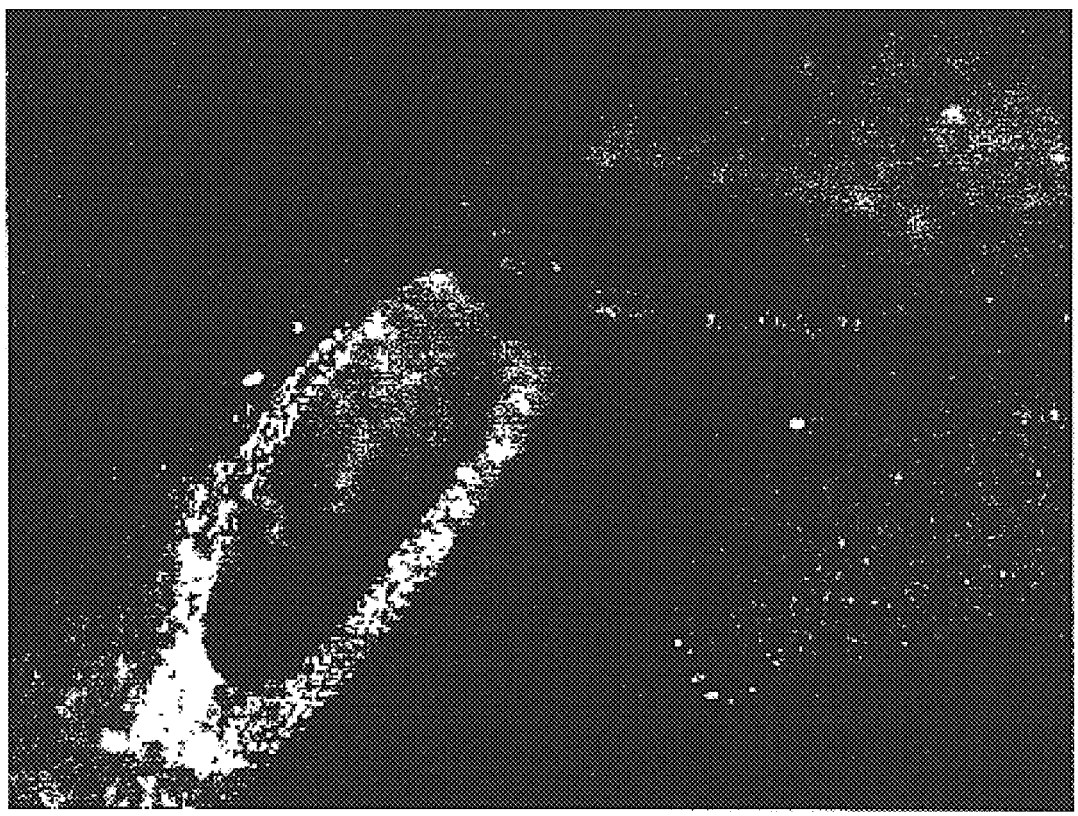
FIG. 4 is a photograph of the hollow macrotubes having walls consisting of aligned carbon nanotubes.

The shape of the structure can be altered and depends on the shape of the spinneret cavity. If the spinneret cavity has a round opening, the structure will form in a rod-like shape with the carbon nanotubes surrounding the parallel polymers of the first and second composition. In this case, the carbon nanotubes become the walls of hollow macrotubes when the polymers are removed as shown in FIGS. 1A, 1B and 4.

Depending on the type of application, the structure may further comprise at least one of deposited or infiltrated carbon, silicon and silicon carbide which has been deposited in the carbon nanotubes.

Thus, these materials comprising carbon nanotubes have high modulus, high strength, and high toughness for structural applications such as for brake pads in airplanes, as well as for multifunctional applications where extreme mechanical properties are combined with other functionalities, such as actuation, mechanical energy harvesting, mechanical dampening, thermal energy harvesting, and energy storage.

The nanotube structure of the invention can be utilized for the storage of gases such as hydrogen. Carbon nanotubes are known to store hydrogen (M. S. Dresselhaus et al., MRS Bulletin 24, 45–50 (1999)) and the fiber or ribbon geometry is good for this application because it keeps the nanotubes in place (i.e., the nanotubes don't fly out with the hydrogen when the hydrogen is withdrawn from the storage vessel). The gas storage system can be an annular nanotube body made by winding the nanotube fiber or ribbon on a mandrel. This annular body would be contained in a cylindrical pressure vessel with a gas inlet/outlet port. An external or internal heater would be used for desorbing the stored gas.

The actuators enabled by the fibers, ribbons, and yarns of this invention may be used for the conversion of electrical energy to mechanical energy. The applications for these mechanical actuators are diverse and include, for example, robotic devices; high temperature air flow valves for aircraft engines; optical switches for optical fiber interconnects; adjustable structures for vibration suppression and failure avoidance; phase shifters for optical gyroscopes; precision electronic gyroscopes; and artificial muscles for space suits. These electromechanical actuators resulting from invention embodiments can provide (a) high-stress-generation capabilities, (b) high gravimetric and volumetric work capabilities per cycle, and (c) high volumetric and gravimetric power generation capabilities. Also, the actuators of the preferred embodiments can operate at low voltages, which provides savings in device electronics, avoids potential safety hazards, and minimizes electromagnetic interference effects.

The carbon nanotube fibers of invention embodiments can also be used for carrying high currents. This capability to carry high currents results from the combination of their reasonably high electrical conductivities and their high thermal conductivity and high thermal stability (enabling substantial heating and conduction of produced heat from the fibers). The invention embodiments that provides the NT fibers of this invention as windings on a mandrel (with optional heat set on the mandrel) enables a preferred use of the carbon nanotubes as motor windings, electromagnet windings, and the winding for transformers.

The present invention, in part is drawn to an apparatus for preparing the structure comprising carbon nanotubes. The following description of the apparatus refers to FIG. 2, which (for simplicity) shows a single capillary (combination of 6, 10, 2, 5a, 17, 24, and 15) formed in the lower spinneret (4) and the upper spinneret (1); however, the apparatus can have multiple capillaries, preferably 5–30 capillaries. Said apparatus comprises an upper spinneret (1) having inner walls (3) defining a cavity (A) (2) through which a core polymer flows, a lower spinneret (4) having inner walls (5) defining a cavity (B)(5a) which is aligned with the cavity (A) (2) so that the core polymer flowing from the upper spinneret (1) flows directly into the cavity (B)(5a), the lower spinneret (4) having an upper surface (20, 22) which is indented to form at least one cavity (C) (6, 10) for a mixture comprising a sheath polymer and carbon nanotubes (19), wherein the cavity (C) (6, 10) is defined by an inner wall (7, 11), bottom wall (8, 12) and outer wall (9, 13), a spacer (shim) (18, 24) is in contact with the upper surface (20, 22) of the lower spinneret and a lower surface (21, 23) of the upper spinneret, said spacer (18, 24) separating the upper surface (20, 22) of the lower spinneret from the lower surface (21, 23) of the upper spinneret to form a tubular passage (also referred to herein as "annular space") (17, 24) which connects cavity (C) (6, 10) with cavity (B) (5a) to allow flow of the sheath polymer/carbon nanotube mixture from cavity (C) (6, 10) to cavity (B) (5a) to coat the core polymer to form a carbon nanotube coated polymer mixture, the inner walls defining cavity (B) (5a) constrict at a constricting point (14) to reduce the diameter of cavity (B) (5a) at element (15) from a distance $D_i$ to a distance $D_e$ thereby increasing the shear force on the carbon nanotube coated polymer mixture before exiting the apparatus through an exit hole (16) in the lower spinneret (4).

There may be multiple cavities (C)(6, 10) which are concentrically located around cavity (B)(5a) and are each connected to cavity (B)(5a) with an annular space (17, 24). In addition, it is contemplated that cavity (C)(6, 10) may be a single concentric cavity which is connected to cavity (B)(5a) by multiple annular spaces (17, 24). The distance between cavity (B)(5a) and cavity (C)(6, 10) relates to the value of $D_o$. Specifically, $D_o$ is an average of twice the distance between the inner wall (7, 11) of cavity (C) (6, 10) and the center of cavity (B)(5a), and this distance is measured at an angle which is perpendicular to the flow of the core polymer through cavity (B)(5a). In the situation where the cavity (C)(6, 10) is a single concentric cavity which is connected to cavity (B)(5a) by multiple annular spaces (17, 24), the line $D_o$ is a measure of the diameter of the inner wall (7, 11).

The spacer or shim between the upper spinneret (1) and the lower spinneret (4) can be adjusted in size to adjust the height of the annular space (17, 24).

By adjusting the spacer (shim) (18, 24) height, the shear force imposed on the polymer composition can be adjusted, since the shim height relates to the velocity of the polymer flow. It is preferred that the shim height be adjusted so that the height of the annular space is less than the average length of the carbon nanotubes. This small height aids in aligning the carbon nanotubes in the direction of the flow.

The velocities $V_o$ and $V_i$ are measured at the point of flow where $D_o$ and $D_i$ are measured, respectively. An increase in the ratio of $D_o/D_i$ results in an increase in the velocity of the flow of the polymer/carbon nanotube composition as shown in the following equation.

$$D_o/D_i = V_i/V_o.$$

Since the flow at this portion of the apparatus is essentially sheet-like, the increase in velocity is directly proportional to the decrease in diameter.

In the inventive apparatus, the composite material is subjected to further extensional flow as the diameter of the capillary decreases from $D_I$ to $D_e$ at the constriction point (14) of the capillary. Since the extensional flow in this portion of the apparatus is a cylindrical-type flow, the velocity increase is proportional to the square of the ratio of the diameters as follows:

$$V_e/V_i = (D_I/D_e)^2$$

The ability of the inventive apparatus to orient a much higher concentration of carbon nanotubes than has been shown in the prior art is attributed to the combination of the two points in the apparatus where the velocity increases. The present inventors are not aware of prior art teaching this advantage.

The following examples are provided by way of illustration to show how the inventive structure comprising oriented carbon nanotubes can be prepared and should not be construed as limiting the invention in any way.

INVENTIVE EXAMPLES (1)–(4)

Figure 3:
FIG. 3 is a photograph of the cross section of macrotubes having walls consisting of aligned carbon nanotubes and the core of each macrotube contains polypropylene.

Macrotubes comprising oriented carbon nanotubes were prepared as follows. Multiwall carbon nanotubes (product designation—"PR19HT" from Applied Sciences, Inc. 141 West Xenia Ave. Cedarville, P.O. Box 579, Ohio 45314-0579) were used having the following dimensions: 1) 90 nm inner diameter; 2) a carbon vapor deposited outer layer resulting in an outer diameter of 150–200 nm; and 3) 50–100 microns in length. These multiwall carbon nanotubes were annealed in vacuum at 3000° C. 30 wt % of nanotubes were compounded with 70 wt % polypropylene having a melt flow index (MFI) of 55 (product designation "RG-7910" supplied by Solvay Polymers, Inc, 3333 Richmond Ave, Houston, Tex. 77098-3099) to form a second composition. This second composition was spun as a sheath in a bicomponent fiber spinning apparatus (described in the following paragraph) with a first composition which formed a core consisting of 100% polypropylene having a NFI=9.5 (supplied by Solvay Polymers, Inc) to form macrotubes having walls composed of oriented carbon nanotubes and a polypropylene core as shown in FIG. 3.

Figure 2A:
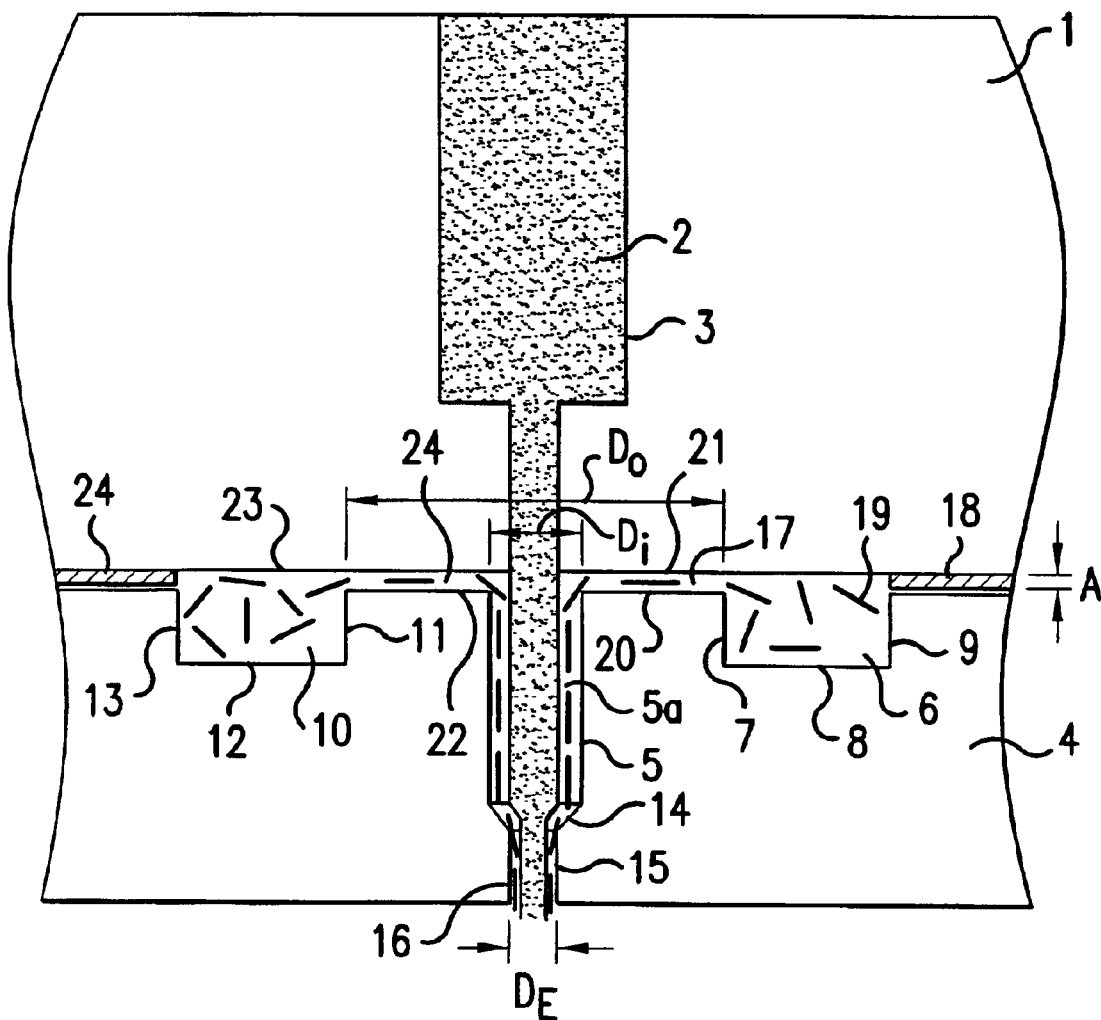
FIG. 2A is a schematic diagram of the spinning apparatus.
Figure 2B:
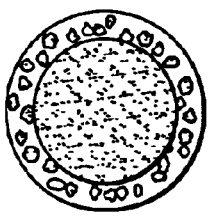
FIG. 2B is a cross section of cavity (B) (5a) of the spinning apparatus of FIG. 2A depicting the core polymer surrounded by aligned nanotubes.

The apparatus is shown in FIG. 2 and was designed to induce an extensional flow on the composition. It consisted of 18 annular passages having an outer diameter $D_o$=0.1 inch, an inner diameter Di=0.05 inch and an exit diameter $D_e$=0.015 inch. A spacer having a thickness of 0.003 inch (76 micron) was used to control the diameter of the annular space A. By maintaining the diameter of the annular space to a distance that is less than or equal to the average length of the carbon nanotubes, the carbon nanotubes begin to align in the direction of the flow. The sheath composition supplied in the annular space from the surrounding cavity (C)(6, 10) undergoes an extensional flow as it travels inside of the annulus. Initially the ratio of composition velocities increase according to $V_i/V_o=D_o/D_i=0.1/0.05=2$. Then the composite material is subjected to further extensional flow as the diameter of the capillary decreases from 0.5 in. to 0.15 in. at the constriction point (14) of the capillary. The ratio of the velocities is proportional to the square of the ratio of the diameters since this is a cylindrical-type flow. The increase in the velocity due to the constriction (14) satisfies the relationship $V_e/V_i=(D_i/D_e)^2=(0.5/0.15)^2=11.1$ The orientation of the carbon nanotubes of the sheath composite is attributed to this high velocity extensional flow in the annular and cylindrical spaces as well as the high shear taking place in the annular space due to narrow slot A. As a result, the multiwall nanotubes in the sheath assumed a preferential orientation along the axis of the polypropylene fibers to form macrotubes having walls composed of oriented carbon nanotubes and a polypropylene core as shown in FIG. 3.

Preinfiltration Step—

The macrotubes containing a polypropylene core were subjected to a pre-infiltration treatment step to remove the polypropylene core as follows:

Example (1)—no pre-infiltration treatment step;

Example (2)—the spun samples were placed in a furnace at 500° C. under air and the polypropylene was burned out leaving the hollow cylindrically shaped macrotubes;

Example (3)—the spun samples were placed in a microwave oven under air and the polypropylene was burned out leaving the hollow cylindrically shaped macrotubes; and Example (4)—the spun samples were placed in a microwave oven under nitrogen and the polypropylene was removed by melting leaving the hollow cylindrically shaped macrotubes.

The cylindrically shaped hollow macrotubes of Examples (2)–(4) are shown in FIGS. 1A, 1B and 4. FIG. 1B shows the macrotube at the break. This clearly shows that the carbon nanotubes are preferentially oriented in the lengthwise direction of the hollow macrotube. This hollow macrotube structure comprising carbon nanotubes is preferred for applications for supercapacitor applications. Actuator devices, supercapacitor, energy harvesting and related electrochemical devices based on carbon nanotubes are described by Baughman et al. in Science 284, 1340–1344 (1999). Also, Tennent et al. have described in U.S. Pat. No. 6,031,711 the application of sheets of carbon nanotubes as high performance supercapacitors.

Figure 5:
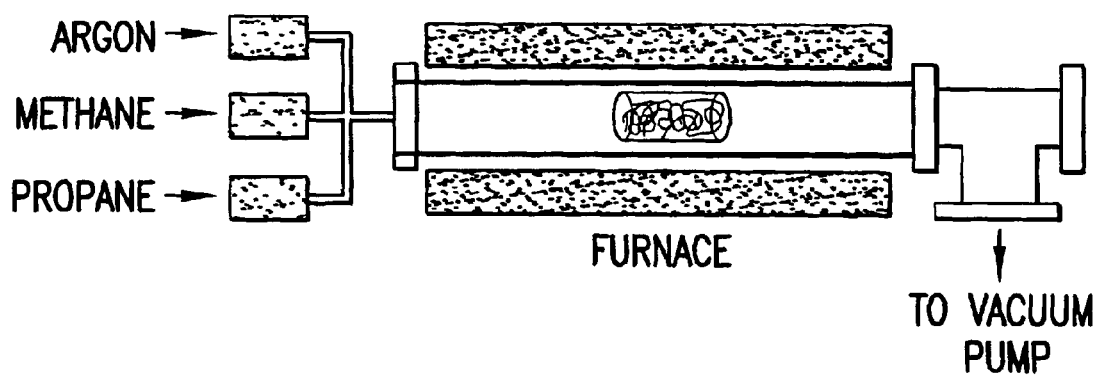
FIG. 5 is a schematic diagram of the infiltration reactor containing a 3-zone furnace with a constant temperature hot zone about 14 inches long.

The Following Describes the Experimental Apparatus of FIG. 5 and Conditions Used to Density the Carbon Fibers.

The macrotubes were mounted in the infiltration reactor of FIG. 5 by placing a quantity of the fiber material inside of an approximately 1" diameter×3" long quartz tube that is open on both ends, or by winding the fibers on the exterior of the quartz tube. The quartz tubes were then placed on a quartz carrier and inserted into the reactor. The tubes containing the fibers were centered along the axis of a 3" ID quartz reactor tube. This tube is contained in a 3-zone furnace with a constant temperature hot-zone approximately 14" long. A schematic of the infiltration reactor is shown in FIG. 5.

The reactor gas flows are controlled by MKS mass flow controllers, and the pressure is set by an MKS pressure control valve at the furnace exit. All process parameters (gas flows, reactor pressure and furnace temperature) are controlled by computer.

After the fiber samples were placed in the reactor, the system was evacuated using a roughing pump. After pump down, the infiltration cycle was initiated as follows. An argon stream was introduced into the reactor at a flow rate of 586 standard cubic centimeters per minute (sccm) and a pressure of 60 torr. The reactor was heated to 500° C. in 15 minutes while maintaining the above gas conditions. This temperature was maintained for 10 minutes and then increased to 1020° C. in 30 minutes. After a 10 minute soak at 1020° C., the argon stream was switched to the infiltration gas mixture which consisted of 576 sccm of methane (99.97% purity) and 11.7 sccm of propane (99.5% purity). These gas flows were maintained at a pressure of 60 torr for 12 hours, after which the reactor was cooled to room temperature under an argon gas flow as described above. The infiltration conditions described form a carbon layer that is approximately 0.5 μm thick.

The result was a hollow macrotube in which an air core is surrounded by a sheath comprising a composite of axially oriented nanotubes as shown in FIGS. 1A and 1B.

Measured Mechanical Properties of Macrotube Fibers Additionally Consolidated Through CVD Process—

Sections of the macrotube fiber were tested by the 3-point flex method as described in ASTM D790-86. The flex stress and the modulus were calculated using the formulas given in the standard. The nominal external fiber sample diameter D=0.015 in. The fiber is hollow with an internal diameter d=0.0084 in., and the internal to external diameter ratio is approximately d/D=0.56. The test was performed using a beam span (distance between the supports) L=0.25 in. The tester loading (crosshead) speed used in the test=0.1 in/min.

The average flex breaking strength calculated by the standard formulas for the sample (the nominal sample diameter D=0.015 in) is 28.7 ksi (kilopounds per square inch=1000 psi) or 0.22 GPa. The average modulus is 2.06±0.27 Msi (megapounds per square inch=1,000,000 psi) or 16 GPa, and elongation to break is equal 1.5%. Taking into consideration the fact that the outer crust of the macrofiber is CVD material only, the calculated values for the strength and the modulus are higher.

For the homogeneous nanotube material (with outside diameter D=0.138 in, as estimated from the micrographs), according to the standard formulas the strength is equal= 0.30 GPa and the average modulus=24.6 GPa. These results are shown in the table, where they are compared to the data for conventional C/C brake composite (PAN+pitch):

|  | Hollow fiber with nanotube composite (multi-wall nanotubes + CVD) | |
| --- | --- | --- |
| Conventional C/C brake composite (PAN + pitch matrix) | Assume 0.015" Dia | Assume 0.138" Dia |
| Flex strength 13–20 Ksi (0.091–0.14 GPa) | 0.22 GPa | 0.3 GPa |
| Modulus 3–5 Msi (21–35 GPa) | 16 GPa | 24.6 GPa |

COMPARATIVE EXAMPLE (1)

A mixture of 30% by weight of carbon nanotubes and 70% polypropylene was spun into a fiber using a conventional apparatus such as described by Glatkowski et al. (U.S. Pat. No. 6,265,466). The apparatus includes a spinneret having a cavity with a single point of constriction at the spinneret exit. Thus, this apparatus provides only a single point where the velocity increases. The increase in velocity of $V_e/V_i=(D_i/D_e)^2=(0.5/0.15)^2=11.1$.

The resulting extrusions of Comparative Example 1 as well as the macrotubes produced in Inventive Example 1 were examined by x-ray diffraction to determine the degree of orientation "f" of carbon nanotubes in the matrix. The degree of orientation "f" is a function that varies from 0 for a sample with randomly oriented nanotubes to 1 for a sample in which all the nanotubes are perfectly aligned along one direction.

|  | f |
| --- | --- |
| Inventive Example 1 | 0.656 |
| Comparative Example 1 | 0.587 |

The X-Ray analysis results indicate a higher degree of orientation in the extruded tubes of Inventive Example 1, which was produced with a higher increase in velocity and shear force then the Comparative Example 1 of Glatkowski et al.

EXAMPLE (5)

A total of 6 samples prepared by the method of Example 4 were densified through a CVD process and were mechanically tested.

Using Instron 5565 with a sensitive 2.5N load cell, the sections of the fiber were tested by 3-point flex method using the following parameters:

Selected beam span—0.25 in

Cross head speed—0.1 in/min

The results are provided in the table below. The results in the table below were prepared taking into consideration the following factors. First, the measured nominal external fiber diameter D=0.015 in. Second, the fiber was hollow, with an internal to external diameter ratio of approximately 0.56. Third, the upper crust of the fiber is CVD material only, and does not contribute to the flex resistance, so one has to reduce the outer fiber diameter in the calculation. Using the micro-graphs this reduction was estimated by a factor of 0.9.

COMPARATIVE EXAMPLE (2)

A conventionally prepared carbon/carbon composite brake (PAN+pitch) was tested for comparison with the samples obtained in Example (5) above. The results are given in the following table.

|  | Flex Breaking Strength (GPa) | Average Modulus (GPa) | Elongation to Break |
|---|---|---|---|
| Inventive Example 5 | 0.3 | 24.6 | 1.5% |
| Comparative Example 2 | 0.091–0.14 | 21–35 | — |

Thus, the overall strength of the inventive composite brake pads made by the inventive method is much higher than the strength of the conventional composite brake pads.

It is to be understood that the foregoing descriptions and specific embodiments shown herein are merely illustrative of the best mode of the invention and the principles thereof, and that modifications and additions may be easily made by those skilled in the art without departing for the spirit and scope of the invention, which is therefore understood to be limited only by the scope of the appended claims.

What is claimed is:

1. A process for preparing a structure comprising carbon nanotubes, said process comprising:
   a step of melt flowing a first composition comprising a core polymer through a spinneret to align molecules of the core polymer to be in a substantially parallel arrangement,
   a step of combining a second composition comprising a sheath polymer in the melt phase and carbon nanotubes with the flow of the first composition thereby aligning the carbon nanotubes to be in the general direction of the core polymer molecules, and
   a step of removing at least 50% by weight of the core and sheath polymer molecules.

2. The process according to claim 1, wherein the core polymer and the sheath polymer have backbones comprising at least one identical type of structural unit.

3. The process according to claim 2, wherein the at least one identical type of structural unit is selected from the group consisting of an alkylene, alkene, alkyne, amide, ether, urethane, siloxane, silane, urea, carbonyl and carboxyl.

4. The process according to claim 1, wherein the core and sheath polymers are removed by heat treatment.

5. The process according to claim 1, wherein the carbon nanotubes in the structure are aligned to give an f value of 0.590–1.00.

6. The process according to claim 5, wherein the core and the sheath polymers are removed leaving hollow macrotubes having walls composed of carbon nanotubes.

7. The process according to claim 6, wherein the concentration of the carbon nanotubes in the second composition is 25–50 wt % based on the weight of the second composition.

8. The process according to claim 1, wherein both the core and the sheath polymers wet the carbon nanotubes during the flow step.

9. The process according to claim 1, wherein the core and sheath polymers have a melting temperature ($T_m$) of greater than 50° C. and a weight average molecular weight of at least 10,000.

10. The process according to claim 9, wherein the core and the sheath polymers have a $T_m$ in a range of 50–300° C. and a weight average molecular weight in a range of 10,000–2,000,000.

11. The process according to claim 1, wherein the core polymer and sheath polymer may be the same or different and are a homo- or co-polymer of at least one selected from the group consisting of polyolefin, polyurethane, polysiloxane, polyacrylate, polyalkylacrylate, polymethacrylate, polyalkyl methacrylate, polyamide, polyoxymethylene, polyester, polyesteramide, polyether and polyetheramide.

12. The process according to claim 1, wherein the carbon nanotubes in the second composition are in a concentration of greater than 9 wt % based on the weight of the second composition.

13. The process according to claim 1, further comprising a step of densifying the structure by depositing carbon, silicon or silicon carbide.

* * * * *